July 8, 1958  K. A. BRADSHAW  2,842,322
FISHING LINE REEL
Filed Feb. 17, 1955  2 Sheets-Sheet 1
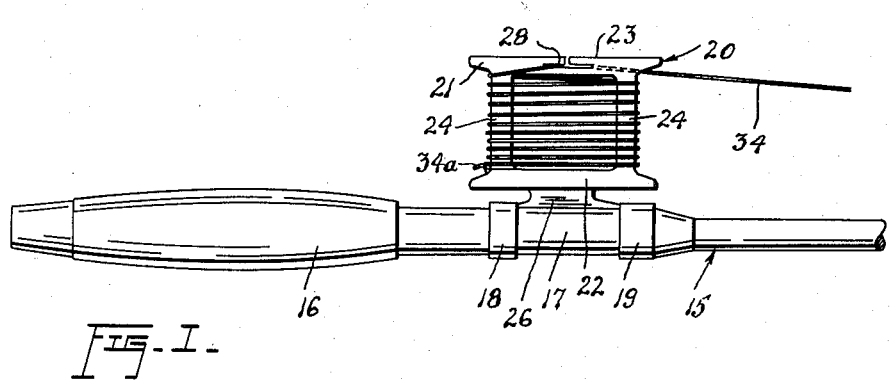
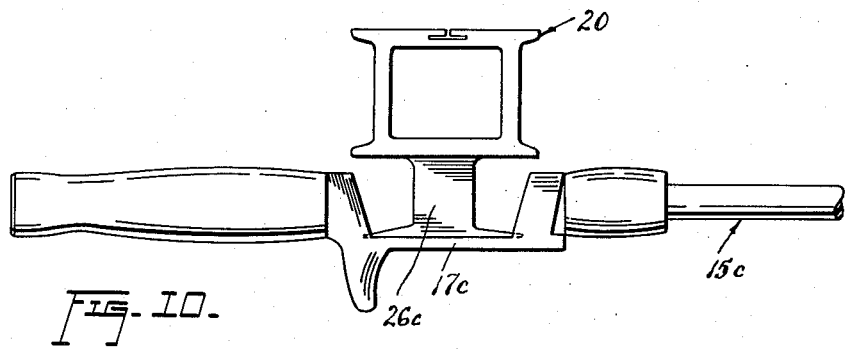
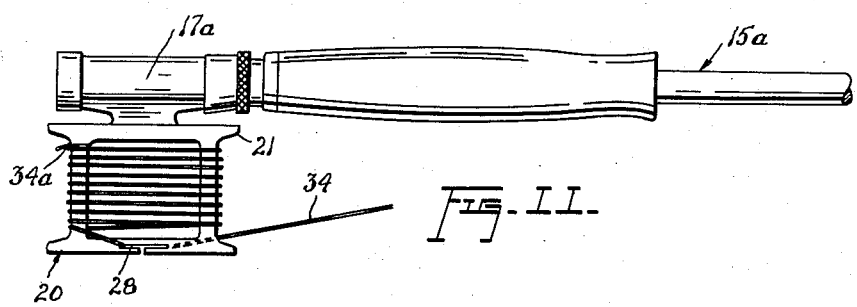
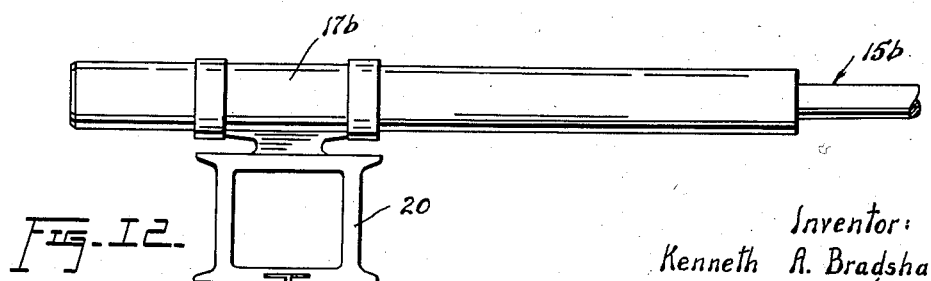
Inventor:
Kenneth A. Bradshaw
By Munson Hoare
Atty July 8, 1958

K. A. BRADSHAW 2,842,322

FISHING LINE REEL

Filed Feb. 17, 1955

Inventor:
Kenneth A. Bradshaw
By Munson Hare
Atty.

United States Patent Office 2,842,322
Patented July 8, 1958

2,842,322
FISHING LINE REEL

Kenneth A. Bradshaw, Richmond, Va.

Application February 17, 1955, Serial No. 488,779

3 Claims. (Cl. 242—84.1)

This invention relates to new and useful improvements and structural refinements in fishing line reels, and more particularly the invention concerns itself with a stationary type reel adapted to have a fishing line wound around the same.

The principal object of the invention is to provide a reel of this type which, in the nature of an attachment, may be quickly and easily installed in the usual reel seat of any conventional fishing rod and which, although primarily intended for use in fly casting, may also be effectively employed in still fishing or trolling.

An important feature of the invention resides in the provision of means for securely locking the fishing line on the reel when the fishing line is of the desired length for casting in order to prevent the line from unwinding from the reel when casting.

Another important feature of the invention resides in the simple, but durable construction of the reel itself.

With the above more important objects and features in view and such other objects and features as may become apparent as this specification proceeds, the invention resides in the details of construction and arrangement of parts substantially as shown in the accompanying drawings, wherein like characters of reference are used to designate like parts and wherein:

Figure 1 is an elevational view of the invention in situ on a still fishing or trolling rod;

Figure 10 is an elevational view of the invention in situ on a plug casting rod;

Figure 11 is an elevational view of the invention on a fly casting rod; and

Figure 12 is an elevational view of the invention on a spin casting rod.

Figure 2:
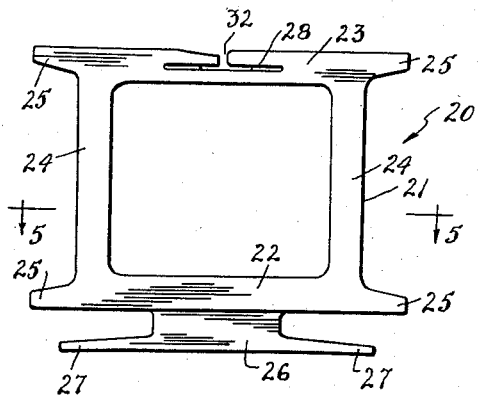
Figure 2 is an elevational view of the reel per se.
Figure 3:
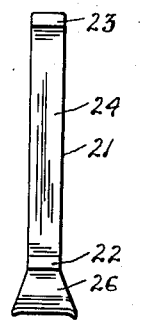
Figure 3 is an edge view of the reel.
Figure 4:
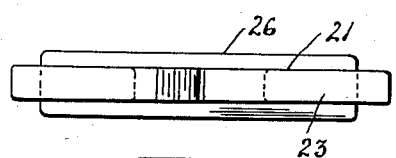
Figure 4 is a top plan view thereof.
Figure 5:
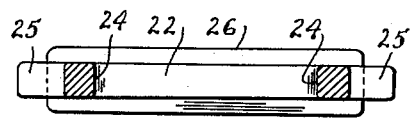
Figure 5 is a sectional view, taken substantially in the plane of the line 5—5 in Figure 2.
Figure 6:
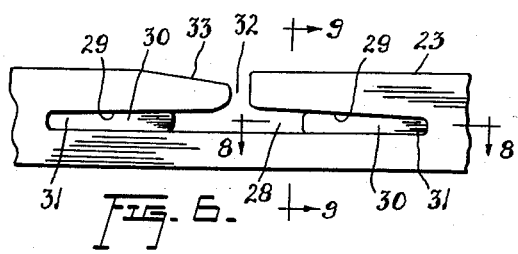
Figure 6 is an elevational, fragmentary view on an enlarged scale showing the line locking means in the reel frame.

Referring now to the accompanying drawings in detail, particularly to Figures 1–9 inclusive, the general reference numeral 15 designates a conventional fishing rod, in this instance a rod commonly used for still fishing or trolling, the same including the usual handle 16 and a reel seat 17 equipped with a pair of spaced keeper elements 18, 19 for holding a conventional mechanical reel on the seat 17.

The reel 20, constructed in accordance with this invention is of a stationary type, adapted to have a fishing line 34 wound around the same by hand instead of rotating the reel for winding a line thereon. As such, the reel 20 comprises a substantially rectangular, flat body frame 21 consisting of a pair of side members 22, 23 and a pair of cross members 24 extending therebetween. The line 34 has one end thereof suitably secured to the frame 21, such as by a knot 34a, and is wound around the cross members 24 as shown. The end portions 25 of the side members 22, 23 project beyond the cross members and sustain the wound line in position thereon.

An elongated base 26 is provided at the underside of the sid member 22 and is adapted to supportably engage the reel seat 17 of the fishing rod, the base 26 having tapered end portions 27 engaged by the aforementioned keeper elements 18, 19 for removably sustaining the entire reel in position on the seat.

As shown in Figure 11, the reel 20 may be also applied to the seat 17a of a fly casting rod 15a, or to the seat 17b of a spin casting rod 15b as shown in Figure 12. The reel may also be applied to the seat 17c of a plug casting rod 15c, but since this seat is usually offset into the rod, the base 26c of the reel is enlarged somewhat, so that the reel frame is disposed at the side of the rod to facilitate convenient winding and unwinding of the fishing line.

Means are provided for securely yet releasably locking the fishing line 34 to the reel body frame 21, these means being located on the side member 23 of the frame and best illustrated in Figures 6–9 inclusive.

Figure 8:
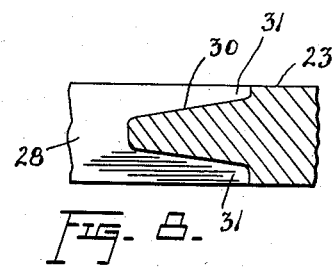
Figure 8 is a sectional detail, taken substantially in the plane of the line 8—8 in Figure 6.
Figure 7:
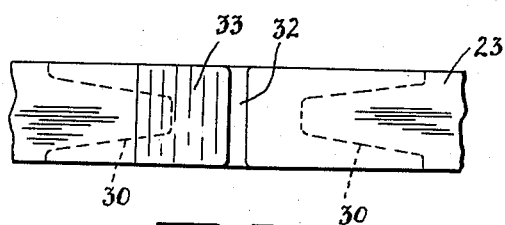
Figure 7 is a top plan view of the subject shown in Figure 6.
Figure 9:
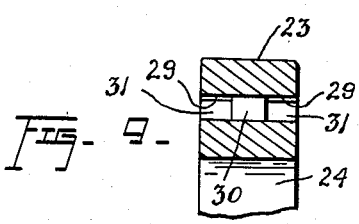
Figure 9 is a sectional detail, taken substantially in the plane of the line 9—9 in Figure 6.

The side member 23 is provided with an elongated and open sided line locking recess 28 which extends longitudinally in the side member and has slanting upper walls 29 so that the end portions of the recess taper outwardly in height, that is, outwardly from the longitudinal center to the ends of the recess. Moreover, the side member 23 is formed integrally with a pair of tapered fingers 30 which are disposed centrally between the open sides in the end portions of the recess 28 and afford pairs of tapered line locking bays 31 in the end portions of the recess at the opposite sides of the respective fingers 30, as is best shown in Figure 8. The fingers 30 are tapered longitudinally from the ends toward the center of the recess 28 and thus, the line locking bays 31 are tapered both in height and in width from the center to the ends of the recess and their tapered ends are adapted to receive and frictionally engage the fishing line for locking the same.

The fishing line is inserted into or withdrawn from the recess 28 through an entrance 32 provided in the side member 23 substantially at the longitudinal center of the recess, this entrance being disposed laterally on the side member and at the outer side thereof, so that it is conveniently accessible. To facilitate insertion of the fishing line into the entrance 32, a portion of the side member at one side of the entrance may be sloped as shown at 33, to act as a line guide for the entrance.

It is to be noted that the frame 21 together with the base 26 may be formed integrally from one piece of material, such as by moulding, or the like, if so desired.

When the invention is placed in use, one end of the fishing line 34 is secured to the frame 21 as indicated at 34a and the line is then wound clockwise or counter-clockwise on the reel. The free end of the line is threaded through the usual fishing line guides (not shown) on the rod. For fly casting, a leader is attached to the free end of the line and artificial bait is connected to the leader. When the desired length of the line is obtained by winding or unwinding the same from the reel, the fishing line is locked by simply passing it through the locking recess 28. This prevents the line from unwinding from the reel when fly casting. When it is desired to adjust the length of the line, that is, the length of the cast, this may be done by simply withdrawing the line from the locking recess 28 and winding or unwinding the line on the reel. The line may then again be locked by passing it through the recess. Of course, the line can be locked at any desired point along its length.

While in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In a line reel, an elongated frame member provided with an elongated and open sided recess extending longitudinally of said frame member, and an elongated tapered finger formed integrally with said member and disposed entirely within one end portion of said recess, said recess having one closed end and communicating at a point remote from said closed end with a lateral entrance at one side of the frame member, said finger having a relatively wide base portion at the closed end of the recess and a relatively narrow end portion adjacent to but spaced from said entrance, the width of said finger being less than the width of the frame member and said finger being disposed centrally in said recess whereby to provide a pair of line locking bays within said recess at opposite sides of said finger.

2. The device as defined in claim 1 wherein said bays are tapered in width toward the base of said finger.

3. The device as defined in claim 1 wherein said recess is tapered in height from said entrance toward its closed end, whereby said bays are correspondingly tapered toward the base of said finger.

References Cited in the file of this patent

UNITED STATES PATENTS

| | | |
|---|---|---|
| 1,016,783 | Schmucker | Feb. 6, 1912 |
| 1,408,261 | Brookhart | Feb. 28, 1922 |
| 1,705,584 | Overstall et al. | Mar. 19, 1929 |
| 2,298,357 | Elvin et al. | Oct. 13, 1942 |
| 2,623,477 | Tuttle | Dec. 30, 1952 |
| 2,665,858 | Barlow | Jan. 12, 1954 |

FOREIGN PATENTS

| | | |
|---|---|---|
| 585,959 | France | Dec. 19, 1924 |